US007903904B1

(12) United States Patent
Loeb et al.

(10) Patent No.: US 7,903,904 B1
(45) Date of Patent: Mar. 8, 2011

(54) SYSTEM AND METHOD FOR LINKING DATA RELATED TO A SET OF SIMILAR IMAGES

(75) Inventors: Michael R. Loeb, New York, NY (US);
Edward J. McCabe, Yonkers, NY (US)

(73) Assignee: Loeb Enterprises LLC., New York, NY (US)

( * ) Notice: Subject to any disclaimer, the term of this patent is extended or adjusted under 35 U.S.C. 154(b) by 997 days.

(21) Appl. No.: 11/707,654

(22) Filed: Feb. 16, 2007

(51) Int. Cl.
 *G06K 9/54* (2006.01)
(52) U.S. Cl. ........................................................ 382/305
(58) Field of Classification Search .................. 382/209,
382/219, 220, 278, 305; 704/239; 705/27;
707/104.1, E17.02, E17.026, E17.028, E17.102;
715/233
See application file for complete search history.

(56) References Cited

U.S. PATENT DOCUMENTS

| 7,450,740 | B2* | 11/2008 | Shah et al. ..................... 382/118 |
| 2002/0093678 | A1* | 7/2002 | Skidgel et al. ................ 358/1.15 |
| 2002/0109712 | A1* | 8/2002 | Yacovone et al. ............. 345/732 |
| 2004/0215958 | A1* | 10/2004 | Ellis et al. ..................... 713/155 |
| 2009/0249185 | A1* | 10/2009 | Datar et al. .................... 715/230 |

* cited by examiner

*Primary Examiner* — Gregory F Cunningham
(74) *Attorney, Agent, or Firm* — Johnson & Scaturro

(57) ABSTRACT

There are provided methods and systems for linking data related to a set of similar images in a manner that both facilitates collaborative data sharing and commenting to generate a more robust set of information about the collective set of images while concurrently allowing users to maintain control over their particular images. A useful and collaborative development of content is achieved between many users interacting with similar versions of the same image. The interacting users may, for example, be friends who may have shared the image through other means, perhaps many years before, or may otherwise be unknown to one another.

22 Claims, 6 Drawing Sheets

300

| UPLOAD PAGE |

— 31

| ATTENDANT DATA |

Figure 1:
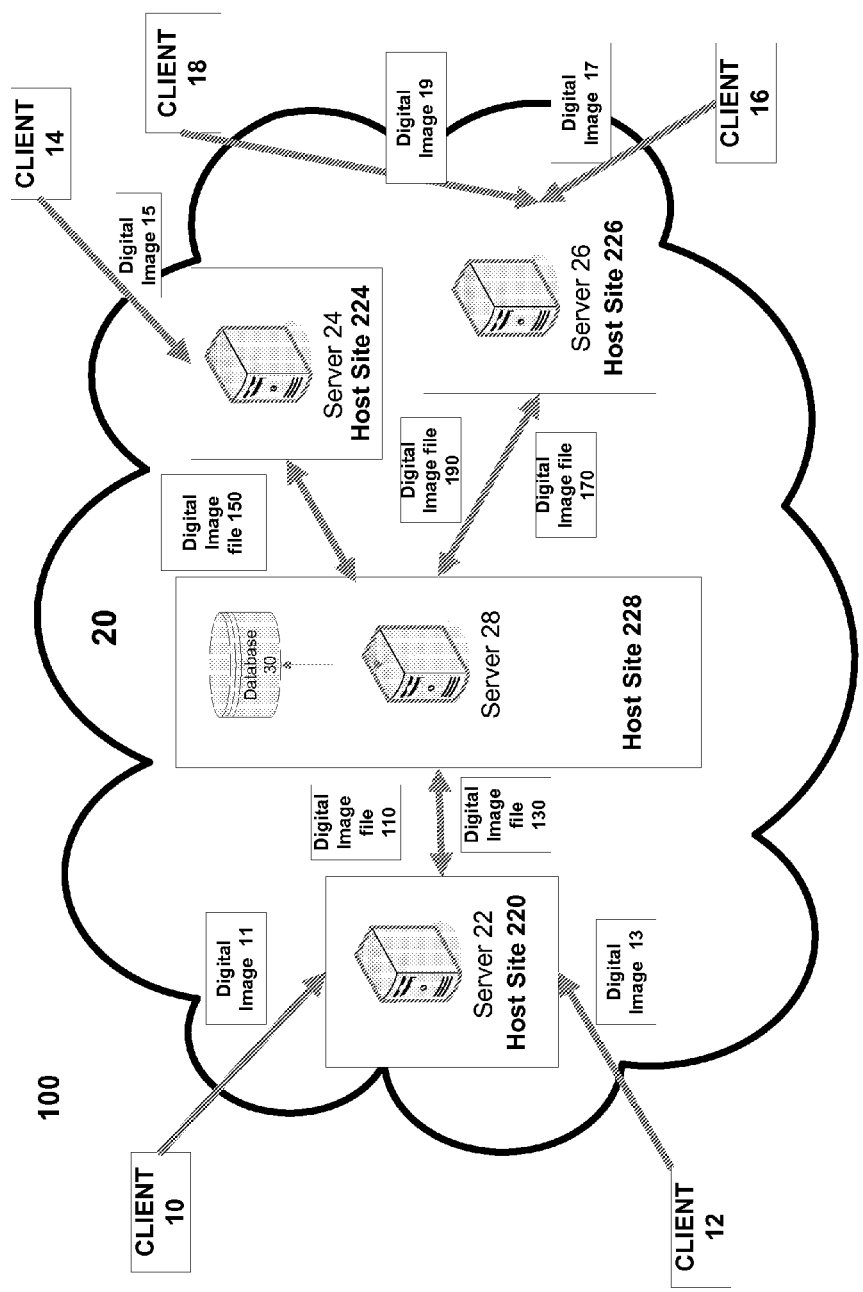

| ENTER COMMENTS | 1. THIS PICTURE TAKES PLACE AT MY FIVE YEAR CLASS REUNION IN 1997, FOR THE GRADUATING CLASS OF 1992.<br>2. FROM LEFT TO RIGHT ARE ME, AND MY FRIENDS TOM JEFFERSON, GEORGE WASHINGTON AND JOHN HANCOCK. |

| ENTER HYPERLINKS | A LINK TO HTTP://WWW.ANYLINKTOCITE.COM |
| | A LINK TO HTTP://WWW.ANYLINKTOCITE.COM |
| UPLOAD FILES | C:/WINDOWS/VOICE.MP3 |
| | C:/WINDOWS/VIDEO.MPG |

— 33

| ARE COMMENTS TO BE MADE ACCESSIBLE ACROSS A SET OF SUBSTANTIALLY SIMILAR IMAGES |

○ YES
○ NO

— 35

| INDIVIDUAL ACCESS RESTRICTIONS |
| (SELECT ALL THAT APPLY) |

○ OTHERS IN YOUR NETWORK
○ IDENTIFY UNRESTRICTED USER GROUP
○ PROVIDE PASSWORD
○ DON'T ALLOW ANYONE TO VIEW COMMENTS

— 37

| SAVE |

*FIG. 3*

LOCAL RECORD = DIGITAL IMAGE FILE 110

DIGITAL IMAGE # 11

ADDITIONAL INFORMATION 112

1 – "This photo reminds me of when we were much younger"  ← 125
2 – "Right after the Bob fell into the swimming pool"  ← 125
3 – "Look at the funny hats everybody is wearing"  ← 125
4 – Privacy Settings  ← 127
5 – Upload date, url of picture, upload ISP  ← 129
6 – Size of picture  ← 129

*FIG. 4*

SYSTEM AND METHOD FOR LINKING DATA RELATED TO A SET OF SIMILAR IMAGES

FIELD OF THE INVENTION

The present invention relates generally to the dissemination of information, and more particularly to a system and method for linking data associated with a set of similar images in a manner that both facilitates collaborative commenting and provides the image owners the ability to maintain control over the data associated with their particular image.

BACKGROUND OF THE INVENTION

With the expansion of the Internet as a social tool, the number and types of sites that facilitate social networking and information sharing have greatly increased. Among the most popular of these sites include those that provide the ability to create a unique profile that link to a social network (MySpace and Friendster), those that provide online picture albums (Flickr) and those that allow users to create a "blog" (Blogspot) that might be accessed by any individual with internet access. The exact form and function of these sites vary, however they all tend to provide some means of establishing an individual page or set of pages, and allow a user to navigate through the network to view the pages of other users in some form of a network. Two common features of sites that provide for photo sharing are that they also allow users to comment on their pictures and on pictures uploaded by others, and provide the content owner with the ability to control access to their picture, in order to protect their individual privacy.

One such social networking site that allows users to comment on digital images is Flickr, digital photo-sharing website and web-services suite. In order to provide for privacy protection, Flickr allows users to control access to groups of photos based upon a viewer's status within their contact list, whether they are family, friends or a non-contact. However, the Flickr system is optimized to share comments openly between all users where comment data is saved related to the unique instance of the photograph. Such a system is seen as the most practical for the purposes of a basic photo-sharing site, however it is not optimal in the case where multiple instances of the same file photo exist in different electronic locations, and viewers of one instance of the photo want to know what other comments are made relative to other instances of the photo.

Another popular means of publishing photos on the internet is Facebook, a commercially available site at http://facebook.com, which allows members to identify other members within photos and comment on photos. While users are able to comment on both their own photos and those photos uploaded by those within their network, this model also fails to associate instances of the same photos uploaded under different names and by different users, and fails to aggregate comments between all instances of the same photograph in a manner that allows users that upload a photograph to read content related to that photograph written by other users.

Another site that allows users to navigate through directories or photos is Riya, which is a commercially available site at http://riya.com. The site is a photo search engine, which enables users to search through an existing reservoir of Internet pictures for objects or individuals. Specifically, it provides a search tool which allows users to identify a picture and find pictures across the available database. It further allows users to fine-tune the results based upon picture properties such as color, shape and texture of the photograph. The site also provides a "Personal search service" that allows users to train a search engine to come to recognize faces common within a user's pictures. It is premised that by honing the ability to recognize the faces of selected subjects within pictures, the precise searching of a network of photographs for those faces is facilitated. The search and comment sharing methodology employed at the Riya site is purposed differently from the present invention and thus, when considering the Riya functionality from an informational sharing perspective, it suffers from a number of drawbacks. Specifically, Riya provides for the comparison of like photographs to the end goal of enabling photo searching and generating search results. It does not provide the methods and systems to consolidate and share data across unique instances of the same photo toward the end of creating a profile that endures beyond an individual instance of the photo. Such a system would allow users that have common photographs to generate and manage data related to the photograph together with other users maintaining a separate instance of the same photograph.

The present invention addresses the foregoing needs.

SUMMARY OF THE INVENTION

The present invention addresses these and other problems in the prior art by providing methods and systems that create new approaches to social networking by linking data related to a set of similar images in a manner that both facilitates collaborative data sharing and commenting, whereby to generate a more robust set of information about the collective set of images while concurrently allowing users to maintain control over their particular images. As will become apparent, the invention provides for the useful and collaborative development of content between many users interacting with similar versions of the same image. The interacting users may, for example, be friends who may have shared the image through other means, perhaps many years before, or may otherwise be unknown to one another.

According to one aspect of the invention, a computer-implemented method is provided for linking data related to a set of similar digital images, the method comprises the steps of: comparing a currently uploaded image with a plurality of previously uploaded images to determine whether said currently uploaded image is similar to at least one of said previously uploaded images; and linking attendant data associated with the currently uploaded image, with other attendant data associated with at least one similar image from among the plurality of previously uploaded images, when said currently uploaded image is determined to be similar to at least one of said previously uploaded images.

The present invention provides numerous advantages over the prior art. A primary advantage provided by the invention is providing image owners who upload their images to a host system with an unprecedented capability for sharing, accessing and editing data posted by other image owners who maintain and control their own versions of an image, which have been determined to be similar to the uploaded image. This capability is not provided or taught in the prior art which only allows an owner of a digital image to upload his image to a host system for viewing purposes and to be the subject of related viewer comments. Other advantages of the invention include the ability to preserve data about a set of similar images without strictly linking the preserved data with particular image instances from among the set of similar images. This is achieved by storing the data in a central data repository, accessible by owners and other viewers of the set of images. By preserving data in this manner, the sharing of narratives and historical accounts is facilitated, which is helpful in passing down written legacies over long spans of time.

DESCRIPTION OF THE DRAWING FIGURES

Figure 2:
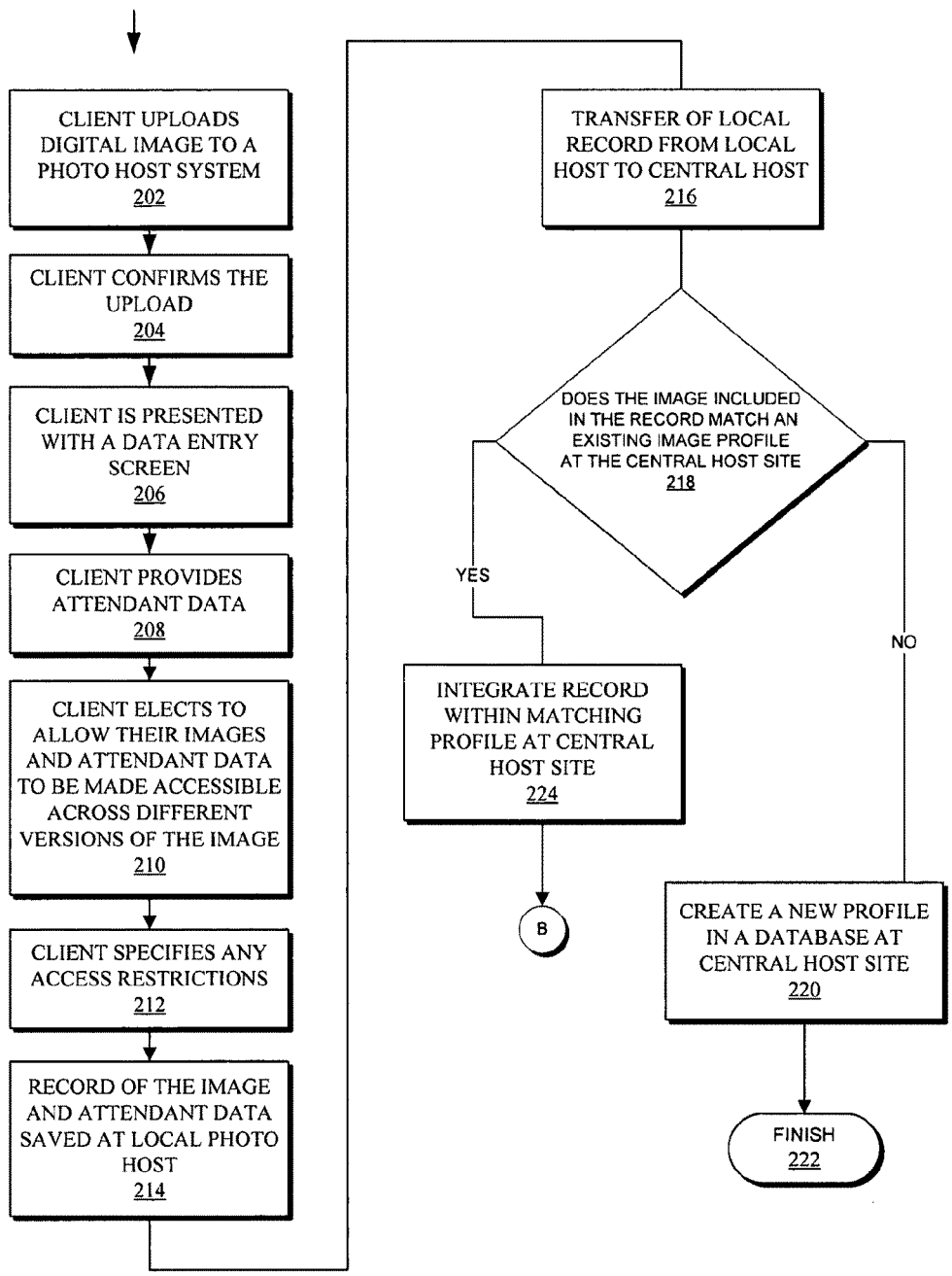
Figure 2A:
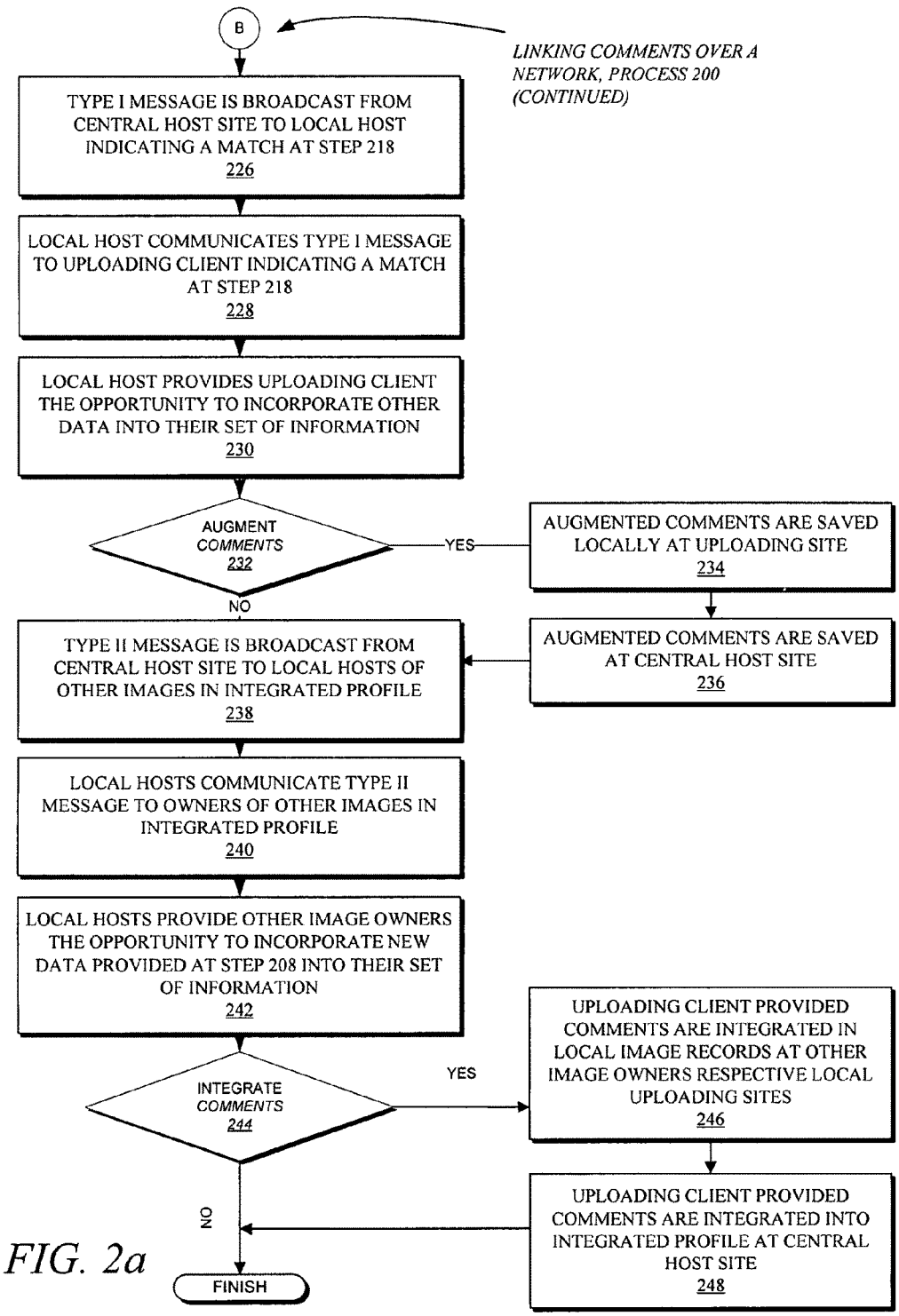
Figure 5:
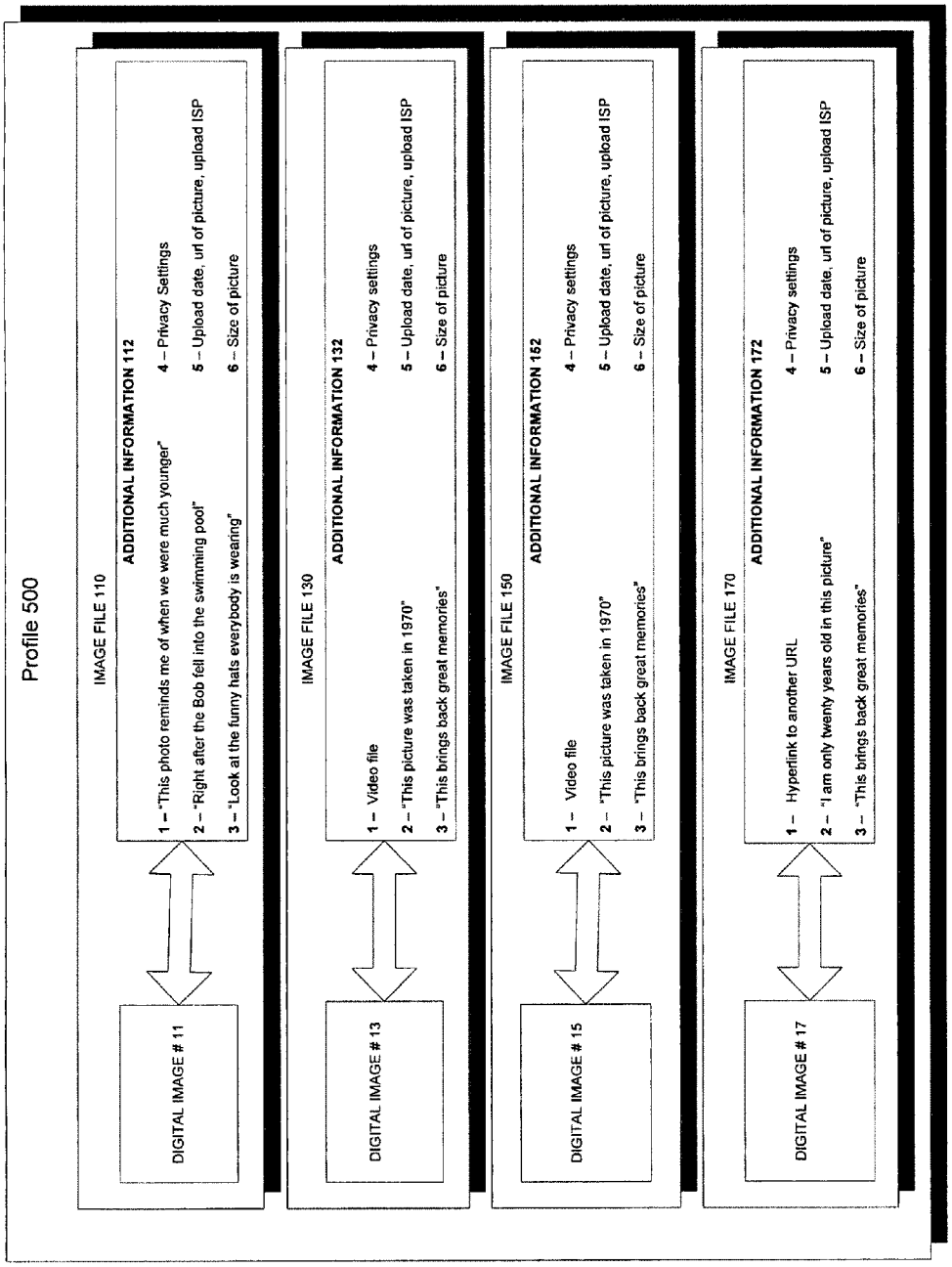

These and other objects, features and advantages of the present invention will be apparent from a consideration of the following Detailed Description of the invention, when considered in conjunction with the drawing Figures, in which:

FIG. 1 is a block diagram of a system according to an embodiment of the present invention, FIGS. 2 and 2A together show a flowchart showing a process for linking information related to a set of similar images, in accordance with an embodiment of the invention, FIG. 3 is an exemplary digital image file which may be created and stored at a local server as a local record, in accordance with an embodiment of the invention, FIG. 4 is an exemplary GUI screen of an editor module, in accordance with an embodiment of the invention, and FIG. 5 is an illustration of an exemplary profile record that may be created and stored at a central web site, in accordance with an embodiment of the invention.

DETAILED DESCRIPTION OF THE INVENTION

The present invention is an internet-based image and data sharing system that allows users to link data related to a set of similar images in a manner that facilitates collaborative commenting to generate a more robust set of information about the collective set of images while concurrently allowing users to maintain control over data associated with their particular image. While particular reference may be made to "digital images" in the described embodiments, it is understood that the invention contemplates the term image to more broadly encompass, for example, picture files including photographs and other images, video files, audio files and the like. Also, while particular reference may be made in the described embodiments to data, in the context of data sharing, it is understood that the invention contemplates the term "data" to more broadly encompass, for example, digitally entered text such as typing, scanned input such as hand-written notes, verbal and audio commentary such as audio files, video and multimedia commentary such as video files, references to other files for the purpose of creating links between a set of similar images and other forms of multi-media data. It should also be understood that the term "similar", as used herein in the context of matching media files such as images, means that, based upon an identifiable subject common to the two media files, appropriate processing technology would identify the two media files as containing the same subject and hence as related. For example, similar photographic or video images would be identified by image processing software of the type described herein as containing the same subject, for example the same person, place or thing.

System Overview

Referring now to FIG. 1, one embodiment of a system 100 for linking data and other associated information for a set of similar images will now be described.

FIG. 1 illustrates a multiple server system 100 comprised of various computers or devices running clients 10, 12, 14, 16, and 18, which are coupled to local servers 22, 24, and 26, which are in turn coupled to a central server 28 associated with a photo-sharing central host site 228. Each of the respective local servers 22, 24 and 26 are associated with a photo-sharing host site 220, 224, and 226, configured to allow clients 10, 12, 14, 16 and 18 to upload and maintain their digital images 11, 13, 15, 17 and 19.

Clients 10, 12, 14, 16 and 18 may include a desktop computer, workstation, laptop, personal digital assistant or any other similar client side, user system known in the art. Clients 10, 12, 14, 16 and 18 are equipped with browser software such as Netscape Navigator, Microsoft Internet Explorer, or any other known browser software.

Clients 10 and 12 upload digital images 11 and 13, respectively, to server 22 of photo-sharing host site 220 via the wide area network 20. The wide area network 20 could be the Internet or an intranet or any other such wide area network or even a local area network. In a like manner, client 14 uploads his digital image 15 to server 24 of photo-sharing host site 224 via the wide area network 20. Similarly, clients 16 and 18 upload their digital images, 17 and 19, respectively, to server 26 of photo-sharing host site 226 via the wide area network 20.

Photo-sharing central host site 228 performs processing, supervisory and management functions associated with the data linking system of the invention. Central host site 228 includes server 28 and data repository 30, which may be local or remote from the central host site 228. The central host site 228 has access to local servers 22, 24 and 26 over the wide area network 20 for receiving digital image files 110, 130, 150, 170 and 190, constructed by and transmitted from the local servers 22, 24 and 26. The digital image files 110, 130, 150, 170 and 190 created by system 100 in accordance with the present invention each generally includes an uploaded image, any attendant data the uploading user, e.g., clients 10, 12, 14, 16 and 18, may wish to provide and certain meta-data and administrative data describing access restrictions, processing information and other image related parameters.

Although multiple servers 22, 24, 26 are shown coupled to the central server 28 in the illustrative embodiment, it should be understood that some embodiments may use only a single server to perform all of the processing, supervisory and management functions including the uploading of image files from clients.

Operation

With reference now to FIGS. 2 and 2A, there is shown a process 200 for linking attendant data related to a set of similar images, according to one embodiment. In the described example, the process 200 is executed by a multiple server system, including a plurality of local servers in data communication with a central server, such as the one illustrated in FIG. 1.

At step 202, client 10, uploads his digital image 11 to a local server 22 which is part of a photo-sharing host system 220, configured to enable clients to upload and maintain their digital image files and associated information.

At step 204, client 10 confirms the upload of the digital image 11 at the photo-sharing host system 220.

At step 206, client 10 is presented with a data entry screen, i.e., GUI, to facilitate the creation of a local record to be stored on the local server 22 at the photo-sharing host system 220. The local record to include the uploaded digital image 11 and other information to be described below.

FIG. 3 illustrates an exemplary data entry screen 300 (GUI) of the present invention, referred to herein as an upload page, which may be presented to client 10 upon uploading his digital image 11 to the photo-sharing host system 220. The upload page 300 facilitates the creation of a local record, including digital image 11 and other information on the local server 22. The upload page 300 includes various input areas for defining various elements to be included in the local record. These input areas are described with respect to steps 208-214.

At step 208, the client interacts with the upload page 300 to create a local record with respect to the uploaded digital image 11. As shown in FIG. 3, the upload page 300 includes a first data entry area 31 for enabling client 10 to input any attendant data which client 10 may wish to include in the local record. The attendant data may comprise, for example, text, picture files, video files, video links, audio files, audio links or any other complementary link. For example, in the exemplary upload page 300 of FIG. 3, the first data entry area 31 includes two (2) text comments, two (2) links to web addresses that client 10 deems relevant, one audio file and one video file.

At step 210, the upload page 300 includes a second data entry area 33 for enabling client 10 to specify whether the attendant data, recorded in entry area 31, is to be made accessible across other similar images. It should be noted that a determination of similarity between the uploaded image 11 and other images is not made until such time at which the uploaded image 11 is forwarded to the central host site 228 for processing.

At step 212, the upload page 300 includes a third data entry area 35 to enable client 10 to specify any access restrictions to be placed on the attendant data provided by client 10 in the first data entry area 31. As shown, client 10 is presented with a number of options for specifying who may access the attendant data provided in the first data entry area 31. For example, client 10 may select one or more categories of viewers who are allowed to view the attendant data, which effectively precludes all non-selected category of users as being denied access to the attendant data. In the presently described embodiment, client 10 may select various viewer categories to view the attendant data, including, for example: users in the user's network, users specified by name or other indicia, users having a password, and/or users otherwise identified by one or more different criteria which will now be apparent to the reader. Client 10 has the further option of denying everyone access to the attendant information except himself.

At step 214, upon depressing the "save" button 47 at upload page 300, a local record is created and stored at the local server 22. The local record includes the uploaded digital image 11 and additional information provided by client 10, via the various data entry areas of upload page 300. In addition, the local record may include data associated with the creation of the and the size of the file, such as the upload date, the URL associated with the image, the ISP of the client at the point of upload and image size.

FIG. 4 is an illustration of an exemplary local record created and stored at the local server 22. The local record is also sometimes referred to herein as a digital image file 110 (as illustrated in FIG. 1) to be uploaded to the central host site 228. As described above, the local record (i.e., digital image file 110) generally includes the uploaded digital image file 11 and additional information 112. The additional information is comprised of, for example: (1) attendant information 125 provided by client 10, (2) privacy settings 127 established by client 10 via the upload page 300 and (3) certain meta-data 129 appended by the local server 20.

At step 216, the digital image file 110 is transmitted from the local photo-sharing host site 220 to the central host site 228 for processing.

At step 218, a determination is made at the central host site 228 as to whether the uploaded digital image 11, included as part of uploaded digital image file 110, matches at least one other pre-existing digital image stored in database 30. Two digital images are said to "match" when they are determined to be similar. The "matching" process is well-known and described more fully below.

At step 220, having determined at step 218 that the uploaded digital image 11 does not match an existing image in database 30, at the central host site at step 220 (i.e., the NO branch of determination step 218), a profile is created from the uploaded digital image file 110 and stored in database 30.

At step 222, the process terminates.

At step 224, having determined at step 218 that the uploaded image 11 matches at least one existing image stored in database 30 at the central host site 228 (i.e., the YES branch of determination step 218), the uploaded digital image file 110 is integrated within an existing profile in database 30 that includes the at least one matching image.

With reference now to FIG. 5, there is shown an illustration of an exemplary profile 500 stored in database 30. For ease of explanation, the exemplary profile 500 is comprised of four constituent digital image files, uploaded at various points in time via the local servers. For ease of explanation, it is assumed that the four digital image files which make up profile 500, include three previously established digital image files 130, 150, 170 and a recently established digital image file 110 (see step 202). Each digital image file in profile 500 shares the common characteristic of including an image that is similar to the images in each of the other digital image files. In other words, digital images 11, 13, 15, 17 have been determined to be similar, as a pre-requisite for grouping the digital image files in the same profile 500, the profile here comprising a grouping of similar content files.

At step 226, the central host site 228 broadcasts data to the local host site 220, from which the most recently uploaded digital image file 110 was received, the broadcast indicating that a successful match occurred at determination step 218.

At step 228, the local host 220 site receives the broadcasted data from central host site 228 and constructs a Type I message, to be transmitted exclusively to client 10, the owner of the recently uploaded digital image 11. The Type I message indicates that a match of digital image 11 has occurred at determination step 218. This Type I message preferably further informs client 10, the message recipient, that he now has the opportunity to supplement his attendant information 125 (see FIG. 4), which was provided at the time of uploading digital image 11 with all, or a portion thereof, of the attendant information provided by the owners of the digital images included in profile 500 which were determined to match the recently uploaded digital image 11, provided by client 10. The Type I broadcast message may be delivered from the local host site 220 to client 10 by various means, including, for example, an e-mail notification, by a network webpage communication to client 10 at the next instance at which he views his photo-album online, by a phone call, facsimile or any appropriate communication.

At step 230, upon receiving the Type I broadcast message, client 10 is provided with an opportunity to view the attendant information provided by the other owners of the matching images in profile 500.

At step 232, a determination step, it is determined whether client 10 chooses to augment his attendant information 125 (see FIG. 4) to include all or at least a portion of the attendant information provided by the owners of the matching images in image files 130, 150 and 170 of profile 500. For example, client 10 may choose to augment his attendant information 125 with the video file of image file 150 provided by client 14 and/or the hyperlink of image file 170 provided by client 16.

At step 234, having determined at step 232 that client 10 responded to the Type I broadcast message by choosing to augment his attendant information 125, the augmented attendant information is saved in the local record of client 10 on server 22.

At step 236, having determined that client 10 responds to the Type I broadcast message by choosing to augment his attendant information 125, the augmented attendant information is saved as part of the attendant information of digital image file 110 in profile 500. It should be noted that the records of the various augmentations of attendant information 125 of digital image file 110 in profile 500 are saved to indicate the original source of each piece of datum.

At step 238, the central host site 280 broadcasts data to the local host sites 220 (the source of image 13), 240 (the source of image 15) and 260 (the source of image 17) from which the matching digital images to uploaded digital image 11 were received, the broadcasted data indicating that a successful match occurred at determination step 218 between image 11 and the sourced image.

At step 240, the local host sites 220, 224, 226 receive the data broadcasted at step 238 and responsively communicate a Type II message exclusively to the owners (i.e., clients 12, 14 and 16) of the matching images 13, 15 and 17 to image 11. This Type II message preferably states that the uploaded image 11, belonging to client 10, is similar to images 13, and 17. In some embodiments, this Type II message may also provide a sample or all of the attendant data 125 uploaded by client 10 in digital image file 110. Further, the Type II broadcast message may be delivered by e-mail, or might alternately be provided to the user the next instance at which they view their album online.

At step 242, the owners of the matching images to image 11 are provided with an opportunity to view the attendant data 125 provided by client 10, and may select particular portions of the attendant data for incorporation into their own attendant data, included, respectively, as part of digital image files 130, 150 and 170 in profile 500.

At step 244, a determination step, it is determined whether the owners of the matching images respond to the Type II broadcast message by choosing to integrate at least a part of the attendant data 125 uploaded by client 10 within their own attendant data, included respectively, as part of digital image files 130, 150 and 170 in profile 500.

At step 246, having determined at step 244 that at least one other owner chooses to integrate the attendant data 125 provided by client 10 into his own attendant data, the attendant data 125 is integrated into a local image record corresponding to the at least one other owner choosing to integrate his attendant data.

At step 248, having determined at step 246 that at least one other owner chooses to integrate the attendant data 125 of client 10 into his own attendant data, the data is integrated into the digital image files 130, 150, 170 of the owners of the matching images in profile 500.

Determining Substantial Similarity Between Two Images

It is instructive to describe what criteria may be used to determine that a match exists between two images. In other words, what criteria determine that two or more images are similar. This aspect of the invention relies on an existing field of technology that specializes in pattern matching and image recognition that is well-known in the art. Such technology has historically been utilized by government agencies to compare pictures of criminals, for example identifying criminals in crowds based upon photos which are entirely different photographs of the same object (generally an individual's face). Such technology has also been used by content owners to screen the internet and other such large databases to locate unlicensed copies of trademarked materials, including but not limited to graphic images. In the present application, this same technology may be used to look for images that contain similar objects or similar images. Lastly, such technology has been articulated as a means of screening large amounts of picture data to identify and control content that would not be appropriate for viewers, for example minors.

One technology company that leads the field in searching image databases to find similar images is LTU technologies of Washington, D.C. and Paris, France. This firm licenses a proprietary technology to segment areas of pictures and index pictures according to their visual properties in a manner that allows for rapid search to find similar pictures, where the degree of similarity can range from duplicates (exactly alike), to cloned images (same image, but edited or transformed) to similar images (contains like elements). The applications articulated by LTU technologies are law enforcement, trademark infringement and image screening for the internet. LTU technology, which can be implemented as a solution for many applications, is not presented in any manner known to Applicants that indicates it has been conceptualized or employed to link consumer records associated with pictures that are similar. Such a system, when implemented as described herein in accordance with the present invention, facilitates the collaborative generation of content related to images uploaded by distinct individuals to distinct locations, where content related to all instances of an image can be associated and integrated. Such a system further allows for networking applications that allow users that own like photos that have either been separated by time or distance to share information without strict access to any one version of a file Other Embodiments According to one embodiment of the invention, it is contemplated to create a novel game wherein a riddle is posed to a viewer, the answer of which is itself a "picture" (i.e., a picture-answer). Viewers upload their respective "picture-answers" to a host site in an attempt to answer the riddle posed by the host site. If it is determined at the host web site that the user's picture-answer is similar to the picture-answer selected by the host web site, the viewer receives a comment related to their "picture-answer" that communicates that they have successfully answered the riddle. Alternately, the viewer's "picture-answer" response to the riddle may provide another set of clues which further directs the user to another photograph. When a viewer successfully answers riddles in some number of consecutive rounds of play an end game is reached.

According to one embodiment of the invention, two or more host websites, each of which are configured to upload and manage user contributed digital images in their proprietary databases, may cooperate to perform a single global redundancy search amongst the various proprietary databases to identify similar images. For example, referring again to FIG. 1, Host web sites 224 and 226 may cooperate to perform a single global redundancy search amongst their respective databases (not shown). This is in contrast to the system configuration of FIG. 1 in which the central host site 228 collects information from each of the respective host web sites 220, 224 and 226 to perform the single global redundancy search, without the need for the participating web sites 220, 224 and 226 to participate or cooperate in a search.

According to another embodiment of the invention, users create data associated with images in a manner that is executed entirely off-line. In this embodiment, users deliver their film or digital image copies as well as data related to the photographs to a third party photo developer (e.g., CVS, Rite-Aid), who in turn, develops the photographs and uploads the photographs and related user-created data to a $3^{rd}$ party host website configured to support the uploading and maintenance of photographs and their associated data in accordance with invention principles. The host website includes a data repository for storing the photographs and user provided data.

According to another embodiment of the invention, an image owner of a given image that is determined to be similar to other images may be required to provide a password and/or an identity check whenever the image owner requests to view data provided by the other image owners.

According to another embodiment of the invention, users who upload image files to a photo host web site may provide for certain attendant data to be made accessible to different groups of individuals according to various criteria. The different groups may be identified according to criteria including, but not limited to: a specifically named individual or individuals, individuals belonging to a particular profession, individuals situated in a certain geography, individuals having particular birth dates or being of a particular age or the individual's status as a member of an organization. In this manner, users could write and share data that might vary in terms of presentation or content based upon the characteristics of the viewing party.

According to one embodiment of the invention, a set of linked data pertaining to a given profile might not be presented to a viewer at one time. Instead, the viewer may be presented with particular data from the set of linked data, incrementally, at some predefined rate over time. The rate at which the data are presented to a viewer can be selected by the user creating the data, (i.e., the image uploader) and measured either against real time (viewers must wait until after some date to view data, and then thereafter only one comment should be made available each month) or measured against the record of a user accessing the photo. In this last case, the user accessing the photograph would be given access to the first comment in one instance, and have to wait some period of time before being given access to the subsequent data.

According to one embodiment of the invention, users that upload images and provide attendant data may choose to restrict the group of viewers who may view the attendant data. The restricted group may be identified in various ways, including, for example, the comment provider explicitly identifying the viewing group, the comment provider establishing password access to the data, and the comment provider restricting access to only those individuals in his or her network.

There have thus been provided new and improved methods and systems for facilitating social networking through data sharing by linking data from among a plurality of identical or similar images (e.g., photographs). In this manner, a bridge is created that provides for not only useful comment sharing today, but allows for multi-generational and valuable information sharing where a trove of information can be unlocked provided a user provides the right key (a photograph). In such a way, users might be motivated to upload all of their photographs, in hopes that past family members might have provided hidden data or messages of substantial informative or sentimental benefit.

While the invention has been shown and described with respect to particular embodiments, it is not thus limited. Numerous modifications, changes and enhancements will now be apparent to the reader.

What is claimed is:

1. A computer-implemented method for linking data related to a set of similar digital images, the method comprising:
   uploading an image to a photo-sharing central server host site, said upload further including attendant data associated with said image;
   comparing at the photo-sharing central server host site, said currently uploaded image with a plurality of previously uploaded images to determine whether said currently uploaded image is similar to at least one of said previously uploaded images,
   identifying at least one similar image from amongst said plurality of previously uploaded images,
   broadcasting a message from said photo-sharing central server host site to a provider of said currently uploaded image, wherein said broadcast message includes a prompt to augment a local server record associated with said currently uploaded image to include attendant data associated with said at least one similar image,
   determining at said photo-sharing central server host site that said provider of said currently uploaded image elects to augment the local server record associated with said currently uploaded image to include said attendant data associated with said at least one similar image.

2. The computer-implemented method of claim 1, further comprising: storing said currently uploaded image and said at least one similar image in a data repository as a single group record.

3. The computer-implemented method of claim 1, wherein said attendant data associated with said currently uploaded image and said attendant data associated with said at least one similar image are selected from the group comprising: text, picture files, video files, audio files and multi-media files.

4. The computer-implemented method of claim 1, further comprising
   displaying to said provider of said currently uploaded image, said attendant data associated with said at least one similar image.

5. The computer-implemented method of claim 1, further comprising:
   (a) broadcasting a message to providers of said at least one similar image, said broadcast message including a prompt to augment said local server records associated with said at least one similar image with at least a portion of the attendant data associated with the currently uploaded image,
   (b) determining, in response to said broadcast message, that said provider's of said at least one similar image elect to augment said local server records associated with said at least one similar image with at least a portion of the attendant data associated with the currently uploaded image,
   (c) augmenting said local server records associated with the attendant data associated with said at least one similar image with at least said portion of attendant data associated with the currently uploaded image.

6. The computer-implemented method of claim 1, further comprising: applying at least one viewing access restriction to the attendant data associated with the currently uploaded digital image.

7. The computer-implemented method of claim 6, wherein said at least one viewing access restriction is applicable to at least one of the group comprising: (a) a network of users, (b) users specified by name, (c) users having a password, (d) individuals belonging to a particular profession, (e) individuals situated in a certain geography, (f) individuals having particular birth dates, (g) individuals of a certain age, and (h) status as a member of an organization.

8. The computer-implemented method of claim 1, further comprising:
   creating said currently uploaded image off-line, and
   delivering said currently uploaded image to a third-party to be uploaded to a host system.

9. The computer-implemented method of claim 1, further comprising:

receiving a viewing rate parameter with the currently uploaded image to establish a rate at which the uploaded image is displayed to users over time.

10. The computer-implemented method of claim 9, wherein said viewing rate parameter is uniquely applied to each viewer as a function of a number of accesses made by said viewers.

11. The computer-implemented method of claim 9, wherein said viewing rate parameter is determined as a function of an elapsed time from the most recent viewing of the uploaded image.

12. The computer-implemented method of claim 1, wherein said currently uploaded image is uploaded from a local server site associated with said photo-sharing central server host site.

13. The computer-implemented method of claim 1, wherein a record associated with the local server record is augmented with attendant data associated with said at least one similar image.

14. A non-transitory computer-readable medium having computer executable instructions for performing the method of claim 1.

15. A system for or linking data related to a set of similar digital images, the system comprising:

a processor;
a memory connected to the processor and storing instructions for operating the processor to perform the steps of:
uploading an image to a photo-sharing central server host site, said upload further including attendant data associated with said image;
comparing said currently uploaded image with a plurality of previously uploaded images to determine whether said currently uploaded image is similar to at least one of said previously uploaded images,
identifying at least one similar image from amongst said plurality of previously uploaded images,
broadcasting a message to a provider of said currently uploaded image, wherein said broadcast message includes a prompt to augment a local server record associated with said currently uploaded image to include attendant data included in a local server record associated with said at least one similar image,
determining that said provider of said currently uploaded image elects to augment the local server record associated with said currently uploaded image to include said attendant data included in said local server record associated with said at least one similar image.

16. The system of claim 15, further comprising: storing said currently uploaded image and said at least one similar image in a data repository as a single group record associated with the photo-sharing central server host site.

17. The system of claim 15, wherein said attendant data associated with said currently uploaded image and said attendant data associated with said at least one similar image are selected from the group comprising: text, picture files, video files, audio files and multi-media files.

18. The system of claim 15, further comprising displaying to said provider of said currently uploaded image, said attendant data associated with said at least one similar image.

19. The system of claim 15, further comprising:

broadcasting a message to providers of said at least one similar image, said broadcast message including a prompt to augment said local server records associated with said at least one similar image with at least a portion of the attendant data associated with the currently uploaded image,
determining, in response to said broadcast message, that said provider's of said at least one similar image elect to augment said local server records associated with said at least one similar image with at least a portion of the attendant data associated with the currently uploaded image,
augmenting said local server records associated with the attendant data associated with said at least one similar image with at least said portion of attendant data associated with the currently uploaded image.

20. The system of claim 15, further comprising: applying at least one viewing access restriction to the attendant data associated with the currently uploaded digital image.

21. The system of claim 15, wherein said currently uploaded image is uploaded from a local server site associated with said photo-sharing central server host site.

22. The system of claim 15, wherein a record associated with the local server record is augmented with attendant data associated with said at least one similar image.

\* \* \* \* \*